United States Patent
Foxx et al.

(10) Patent No.: US 9,694,832 B2
(45) Date of Patent: Jul. 4, 2017

(54) SYSTEM FOR MOUNTING A BRACKET TO A COUPLER HEAD

(71) Applicant: Strato, Inc., Piscataway, NJ (US)

(72) Inventors: Michael J. Foxx, Hillsborough, NJ (US); Jason Reiling, Hillsborough, NJ (US); Kevin P. McGarvey, Piscataway, NJ (US); George Vermesi, Monroe, WA (US)

(73) Assignee: Strato, Inc., Piscataway, NJ (US)

( * ) Notice: Subject to any disclaimer, the term of this patent is extended or adjusted under 35 U.S.C. 154(b) by 171 days.

(21) Appl. No.: 14/861,250

(22) Filed: Sep. 22, 2015

(65) Prior Publication Data

US 2017/0080955 A1 Mar. 23, 2017

(51) Int. Cl.
*B61G 7/00* (2006.01)
*F16L 3/00* (2006.01)

(52) U.S. Cl.
CPC ............... *B61G 7/00* (2013.01); *F16L 3/003* (2013.01)

(58) Field of Classification Search
CPC .... B61G 7/00; F16L 3/00; F16L 3/003; F16L 3/006
See application file for complete search history.

(56) References Cited

U.S. PATENT DOCUMENTS

| | | | |
|---|---|---|---|
| 2,996,315 A | 8/1961 | Roth et al. | |
| 3,344,935 A * | 10/1967 | Stewart | B60T 17/046 213/1 R |
| 3,567,041 A | 3/1971 | Seay | |
| 3,587,868 A * | 6/1971 | Yates | B61G 5/06 213/1 R |
| 3,784,030 A * | 1/1974 | Chierici | B61G 5/06 213/1 R |
| 4,069,836 A | 1/1978 | Sowinski | |
| 4,099,702 A | 7/1978 | Temple | |
| 4,133,561 A | 1/1979 | Cannon et al. | |
| 4,215,881 A | 8/1980 | Scott et al. | |
| 4,392,575 A | 7/1983 | Baker et al. | |
| 4,520,662 A | 6/1985 | Schmid | |
| 4,592,217 A | 6/1986 | Fernandez et al. | |
| 4,665,858 A | 5/1987 | Harrigal et al. | |
| 4,691,563 A | 9/1987 | Martin | |
| 4,876,885 A | 10/1989 | Martin et al. | |

(Continued)

OTHER PUBLICATIONS

AAR Manual of Standards and Recommended Practices, Standard S-4021, Apr. 10, 2006.

(Continued)

*Primary Examiner* — Jason C Smith
(74) *Attorney, Agent, or Firm* — Pearl Cohen Zedek Latzer Baratz LLP

(57) ABSTRACT

A coupler head and mounting bracket combination for supporting a brake hose fitting uses a lug formed integrally with the coupler head and a support bracket mating with the lug. In embodiments, the bracket may be installed in a plurality of vertical positions on the coupler head. The bracket is maintained in a position inboard of the lateral side of the coupler head, to reduce or eliminate the likelihood that the bracket will interfere with the other equipment or the car body. Embodiments of the invention are particularly adapted for "E" type and "F" type coupler heads.

20 Claims, 4 Drawing Sheets

(56) References Cited

U.S. PATENT DOCUMENTS

| | | | | |
|---|---|---|---|---|
| 4,986,500 | A * | 1/1991 | Campbell | F16L 3/01 213/76 |
| 5,131,269 | A | 7/1992 | Blosnick et al. | |
| 5,176,350 | A | 1/1993 | McQuistian | |
| 5,287,739 | A | 2/1994 | Kingsbury | |
| 6,135,665 | A | 10/2000 | Alfieri et al. | |
| 6,568,649 | B1 * | 5/2003 | Schmitt | B61G 7/10 213/75 R |
| 6,588,966 | B2 | 7/2003 | Kane et al. | |
| 7,267,306 | B2 * | 9/2007 | Eason | F16L 3/18 213/76 |
| 7,780,022 | B2 | 8/2010 | Vermesi et al. | |
| 8,066,231 | B2 | 11/2011 | McKiernan | |
| 9,365,220 | B2 * | 6/2016 | Miner | B61G 5/06 |
| D772,041 | S * | 11/2016 | Miner | D8/356 |
| 9,625,060 | B2 * | 4/2017 | Maki | F16L 3/1222 |
| 2004/0155005 | A1 | 8/2004 | Murphy | |
| 2006/0163442 | A1 | 7/2006 | Eason et al. | |
| 2007/0267377 | A1 * | 11/2007 | McKiernan | B61G 7/00 213/75 R |
| 2009/0166479 | A1 * | 7/2009 | Vermesi | B60T 17/046 248/53 |
| 2014/0116976 | A1 | 5/2014 | Halford et al. | |
| 2014/0263146 | A1 * | 9/2014 | Brodie | B61G 7/10 213/76 |
| 2015/0197259 | A1 * | 7/2015 | Miner | F16L 3/003 248/75 |
| 2016/0123502 | A1 * | 5/2016 | Maki | B61H 11/06 29/525.01 |
| 2017/0080955 | A1 * | 3/2017 | Foxx | F16L 3/003 |

OTHER PUBLICATIONS

International Search Report and Written Opinion dated Nov. 29, 2016, International Application No. PCT/US16/50603.

* cited by examiner

SYSTEM FOR MOUNTING A BRACKET TO A COUPLER HEAD

BACKGROUND OF THE INVENTION

Field of the Invention

The present invention is directed generally to an apparatus for mounting a brake line support on each end of a rail car, and more specifically to a coupler head and mounting bracket combination supporting a brake hose fitting. The mounting system may be used with any type of rail car, but features of the invention are particularly adapted for use with a rail car known as a "cushioned car", characterized by having a shock absorbing cushioning unit. Embodiments are particularly adapted for "E" type and "F" type coupler heads.

Description of the Related Art

A brake line for a rail car generally consists of a rigid pipe fixedly attached to a rail car, terminating in an angle cock valve at the end of the rail car. The angle cock valve is connected to a flexible hose supported on a hanger bracket, which maintains a predetermined distance between the hose and the ground, which distance is specified by standards set by the American Association of Railroads ("AAR"). The flexible hose in turn is connected to a trainline support casting, connected to a further flexible hose, referred to as the "end hose", terminating at a "glad hand" fitting. The glad hand connects to a like series of structures on the next adjacent railcar. This system of flexible hoses between cars permits them to be reliably disconnected from and connected with each other, and supports the trainline through a turn, when the axes of adjacent rail cars and couplers are not in alignment. Failure of these elements may result in an emergency brake application, and there are consequently strict AAR standards, and relatively few acceptable arrangements to meet the above stated objectives.

Not long after cushioned cars were first introduced, U.S. Pat. No. 3,587,868 to Yates, assigned to Pullman Incorporated, described and claimed a support bracket mounted directly on a coupler head. However the design had significant drawbacks and did not meet with general acceptance. One drawback of the Pullman design is that mounting the bracket on the coupler requires all four of the conventionally provided openings on the coupler head, which is not adaptable to variations in coupler head designs. Use of all four apertures also prohibits the mounting of an end-of-train device, which is conventionally mounted on the coupler head using two of the apertures. Further, the Pullman design did not allow the trainline support casting to adjust its angle, and the bracket is positioned so far to the side of the coupler, that it could interfere with the angle cock valve on many current cushioned car designs.

U.S. Pat. No. 7,780,022 by the assignee herein describes a coupler-mounted bracket mounted directly on the coupler head using two apertures on the coupler head. The coupler-mounted bracket supports a trainline support casting capable of partial rotational movement in a horizontal plane while supporting brake hoses between railway cars. This casting affords several advantages over the Pullman design, in that it is more streamlined laterally, and uses only two holes on the face of the coupler head, among other features. However, positioning the coupler-mounted bracket on an external face on the guard arm side of the coupler head still has drawbacks, in that the bracket may be attached only in a single fixed position with respect to the coupler head and the bracket may interfere laterally with equipment on the rail car body. The coupler-mounted bracket has also been found to interfere with the car body in the longitudinal direction in some cases. Additionally, attaching the bracket to existing apertures in the coupler head requires non-standard fasteners to accommodate the shape and dimensions of typical coupler head designs, and the bracket mounting position on the guard arm side of the coupler head requires the bracket to have a somewhat elongated and wide shape while positioning the trainline support casting in the desired location.

Thus, there is a need for an improved assembly for mounting a bracket to the coupler head and supporting a trainline support casting (or similar device) that reduces the overall size of the bracket, which increases its strength, prevents the bracket from interfering with the car body in the lateral and longitudinal directions, and which provides for simpler attachment of the bracket at different height positions with conventional fasteners.

SUMMARY OF THE INVENTION

These and other objects of the invention are achieved, according to one aspect of the invention, with a railcar coupler having a lug integral with the coupler head adapted to mount a brake line support bracket for supporting a brake hose fitting. The lug is integral with a wall on the guard arm side of the lock hole of the coupler and comprises a surface facing the guard arm side of the coupler head. The lug is provided with at least two apertures, each aperture configured to receive a fastener through the aperture and through a respective aperture in the brake line support bracket. As a result of this arrangement, the lug and the installed bracket are entirely inboard of a peripheral lateral surface of the guard arm side of the coupler head.

In another aspect, the invention is a coupler head and bracket combination for mounting a brake hose fitting to a coupler of a railcar, comprising a coupler having an integral lug and a coupler-mounted bracket attached to the lug. The coupler head has a guard arm side, a knuckle side, and a lock hole delimited on at least the guard arm side by a lock hole wall. A lug plate for attaching the coupler-mounted bracket is integral with the outboard surface of the lock hole wall and comprises a surface facing toward the guard arm side of the coupler head and at least two apertures. Each aperture is configured to receive a respective fastener (a conventional bolt) for fastening the bracket to the coupler head. The bracket has a first arm extending in a vertical direction and a second arm, integral with the first arm, extending in a horizontal direction parallel to a longitudinal axis of the railcar coupler, away from the coupler head and offset laterally from the first arm. A mounting portion of the first arm comprises at least two mounting holes, each of said at least two mounting holes configured to align with a respective aperture on the lug plate, and configured to receive a respective fastener for fastening the bracket to the lug plate of the coupler head. An end portion of the second arm opposite the first arm is configured to receive a brake hose fitting. The support bracket is inboard of all lateral peripheral surfaces of the coupler head.

In still another embodiment of the invention, the trainline support bracket is a welded or cast feature of the coupler head, connected at one end to the coupler head adjacent the lock hole and extending vertically away from the coupler head, and then parallel to the longitudinal axis of the coupler shank toward the car body. The end of the welded or cast feature toward the car body is adapted to receive a trainline support fitting.

BRIEF DESCRIPTION OF THE DRAWINGS

The subject matter regarded as the invention is particularly pointed out and distinctly claimed in the concluding portion of this specification. The invention, however, both as to organization and method of operation, together with objects, features, and advantages thereof, may best be understood by reference to the following detailed descriptions when read with the accompanying drawings in which:

Figure 1:
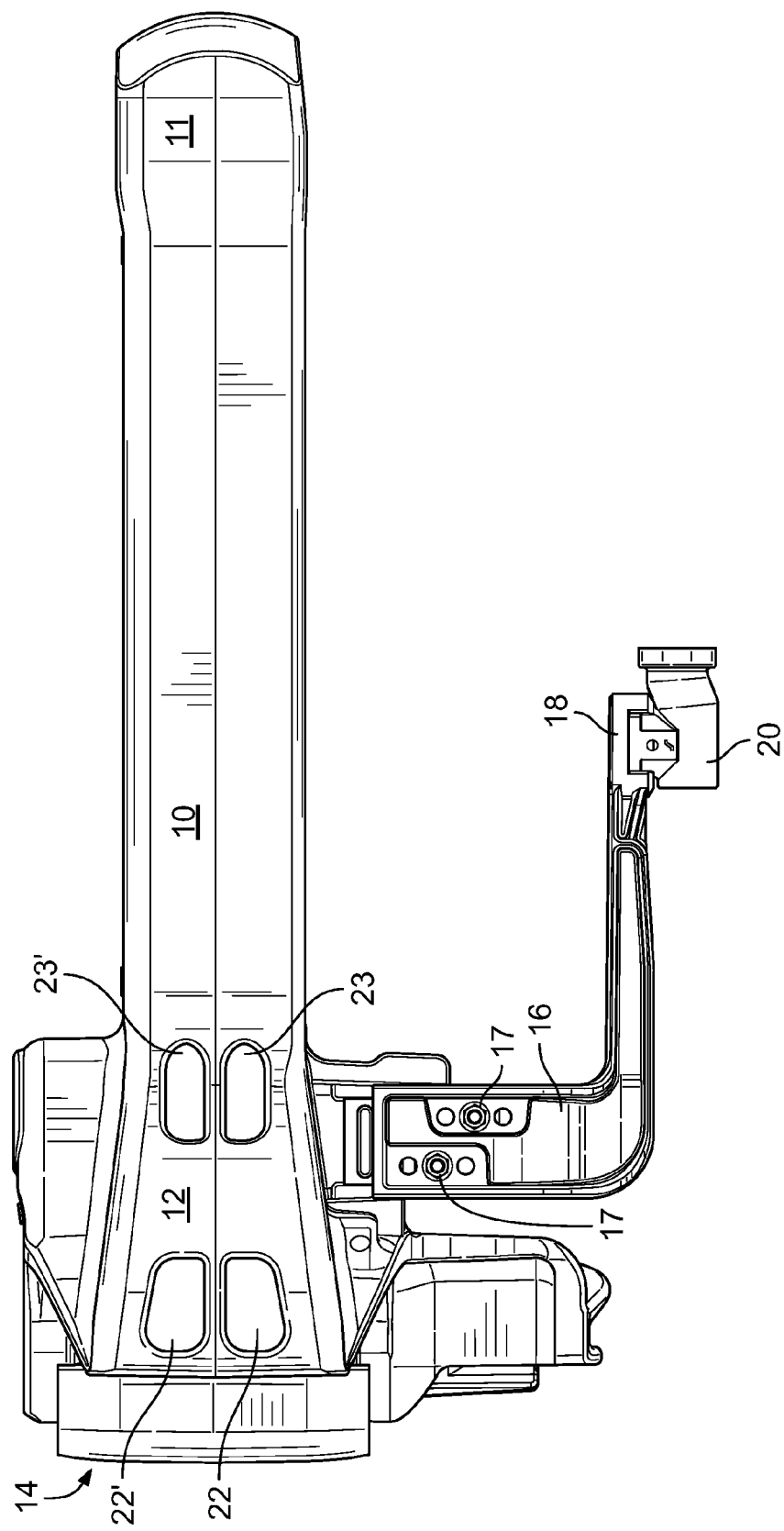
FIG. 1 is a side elevation view of a coupler and bracket combination according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Additionally, the many features of any one embodiment shown in a figure should not be considered independent and separate from the features of an embodiment shown in another figure, and it is conceivable that features of any one embodiment may be combinable with another. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, and/or components have not been described in detail so as not to obscure the present invention.

The terms "trainline" and "brake line" are used interchangeably to refer to pipes, hoses and the like, for conveying pressurized air for pneumatic systems on a railcar. Directions and orientations herein refer to the normal orientation of a railway car in use. Thus, unless the context clearly requires otherwise, the "longitudinal" axis or direction is about parallel to the rails and in the direction of movement of the railway car on the track in either direction. The "lateral" or "transverse" direction or axis is about perpendicular to the longitudinal direction in a parallel plane. "Up" and "top" mean toward the sky; "down" and "bottom" mean toward the ground. "Vertical" is the up-and-down direction, and "horizontal" is a plane parallel to the rails including the transverse and longitudinal axes. These orienting terms are all approximate. The term "inboard" means toward the center of the car or toward the longitudinal axis as context requires. Similarly, "outboard" means away from the center of the car or center line.

As known in the art, the "coupler head" refers to a portion of the coupler, wider than the shank, away from the car body, beginning at about the lock hole. Reference is now made to FIG. 1, which is an illustration of an embodiment according to the invention shown in side elevation. As known in the art, a railcar coupler 10 comprises tail end 11 received in the car body (not shown), and coupler head 12 opposite the tail end receiving a knuckle 14. FIG. 1 is a view taken from the guard arm side of the coupler, showing conventional apertures 22, 22', 23, 23'. Brake line support bracket 16 extends away from the coupler head and has an end 18 adapted to receive a trainline support casting 20. In embodiments, trainline support casting 20 permits partial rotation in the horizontal plane to accommodate a brake hose, similar or identical in effect to the trainline support casting described in the aforesaid U.S. Pat. No. 7,780,022, which is incorporated by reference.

Figure 2:
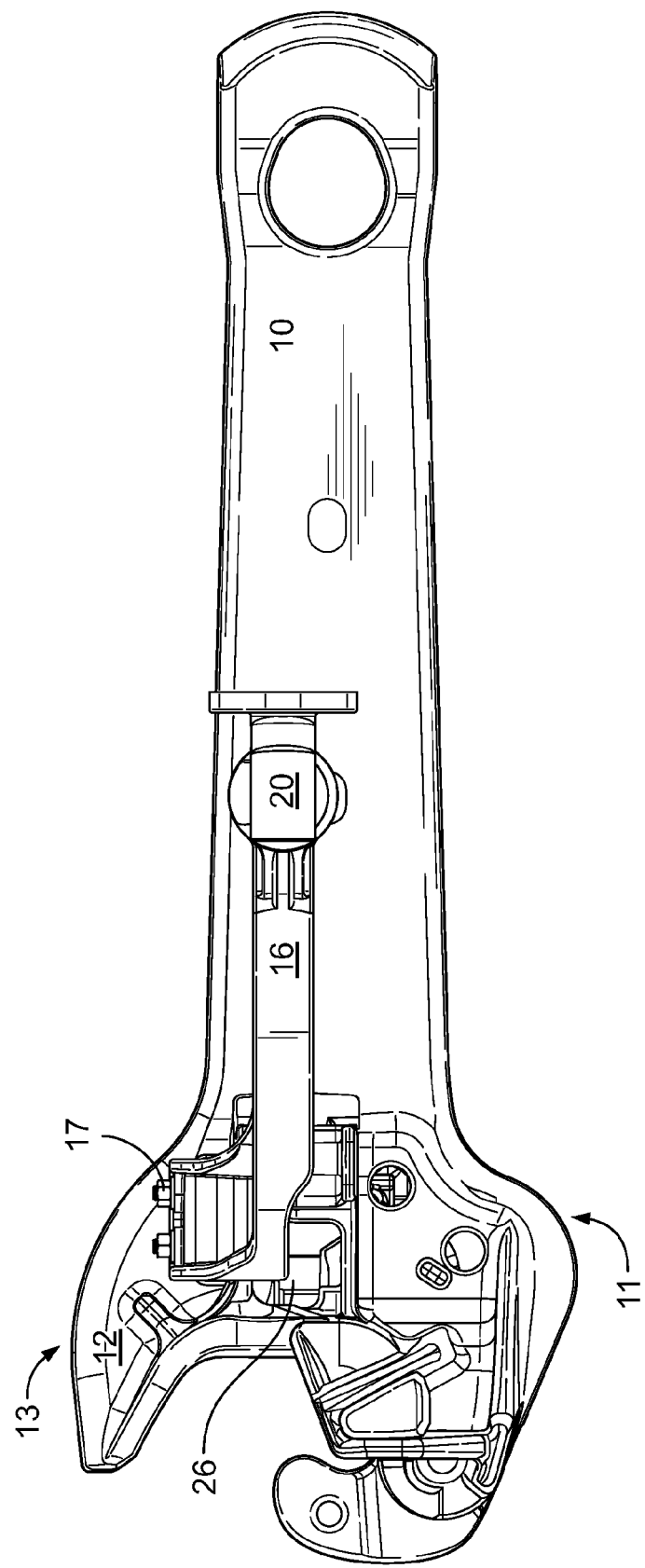
FIG. 2 is a bottom plan view of the assembly of FIG. 1.

FIG. 2 is a plan view of the coupler head and bracket assembly from the bottom, showing coupler head 12 having a knuckle side 11 and a guard arm side 13. As known in the art, lock hole 26 provides access for a mechanism used to install and uninstall the knuckle. Lock hole 26 is delimited on at least the guard arm side by lock hole wall 27, best seen in the isometric detail of FIG. 3.

Figure 3:
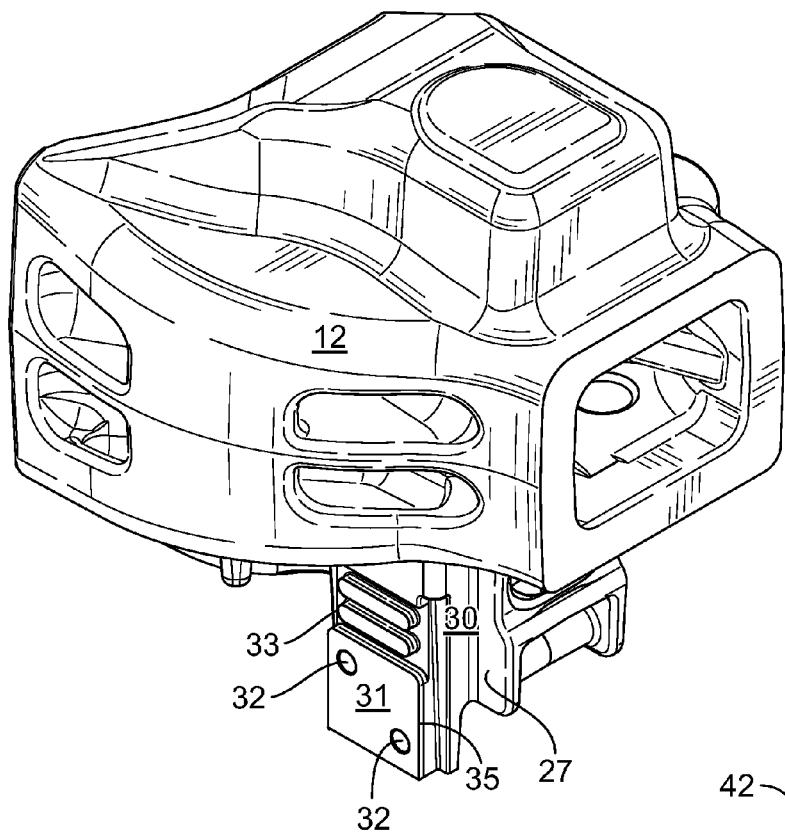
FIG. 3 is a partial detail of a lug plate according to an embodiment of the invention, showing integral attachment to the coupler head.

According to an embodiment of the invention depicted in the isometric detail view of FIG. 3, lug plate 30 is formed integrally with the outboard surface of lock hole wall 27, and may be a cast feature of the coupler or may be welded to the lock hole wall. The lug plate 30 comprises a surface 31 facing toward the guard arm side of the coupler head, and at least two apertures 32 each configured to receive a fastener for attaching bracket 16 to coupler head 12. Preferably, as shown in the plan view of FIG. 2, installed bracket 16, including fasteners 17, is inboard of a peripheral lateral surface of the guard arm side of the coupler head.

Figure 4:
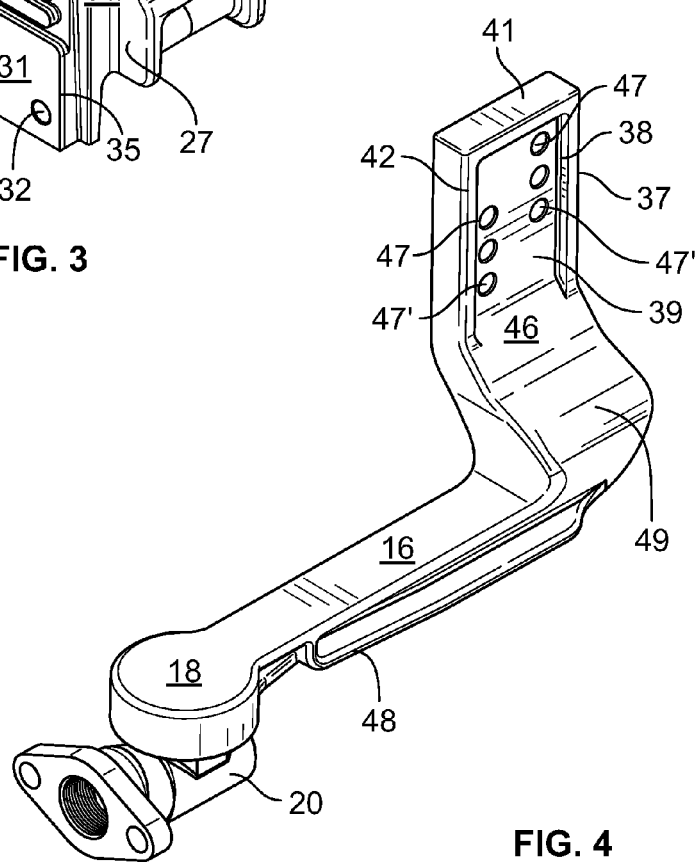
FIG. 4 is an isometric view of a brake line support bracket according to an embodiment of the invention.

Facing surface 31 of lug plate 30 is provided with one or more raised positioning ribs 33 and clamping surface 35 which mate with a surface 39 on bracket 16 shown in the isometric view of bracket 16 in FIG. 4. As shown in FIG. 4, surface 39 is defined by a continuous rib 37 having a horizontal top portion 41 and opposed vertical side portions 42 (together or individually sometimes referred to as "locating ribs"). Thus, a locating surface 38 of rib 37 faces raised clamping surface 35 on lug plate 30. In this way, when bracket 16 is installed on facing surface 31, the bolts received in holes 32 are not subjected to shear and the bracket is immobilized in the vertical and horizontal directions. In a low position, horizontal portion 41 of rib 37 is received in a groove between rib 33 and clamping surface 35. In a high position, horizontal locating rib 41 is positioned vertically above one or more positioning ribs 33.

Brake line support bracket 16 comprises two or more pairs of mounting holes (47, 47) and (47', 47') for receiving fasteners. Each pair of mounting holes is vertically spaced from the other, adapted to position brake line support bracket 16 in at least two vertical positions. According to preferred embodiments of the invention, conventional fasteners 17 are used to attach bracket 16 to lug 30, which avoids the customized attachment mechanism used with commercial coupler-mounted brackets. A back surface of lug 30 opposite receiving surface 31 comprises a locking recess (not shown) adjacent each respective aperture, each locking recess configured in the shape of a slot to receive a conventional bolt. The recess is shaped to prevent rotation of the bolt in the recess when a conventional nut is threaded on to attach bracket 16.

Figure 5:
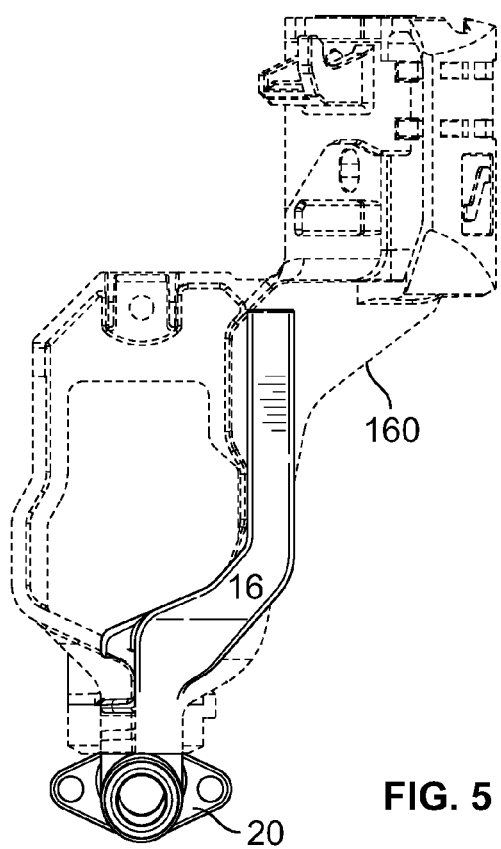
FIG. 5 is a view, along a longitudinal axis, of the profile of the bracket combination according to the invention compared to the prior art, which is depicted in dashed lines.
Figure 6:
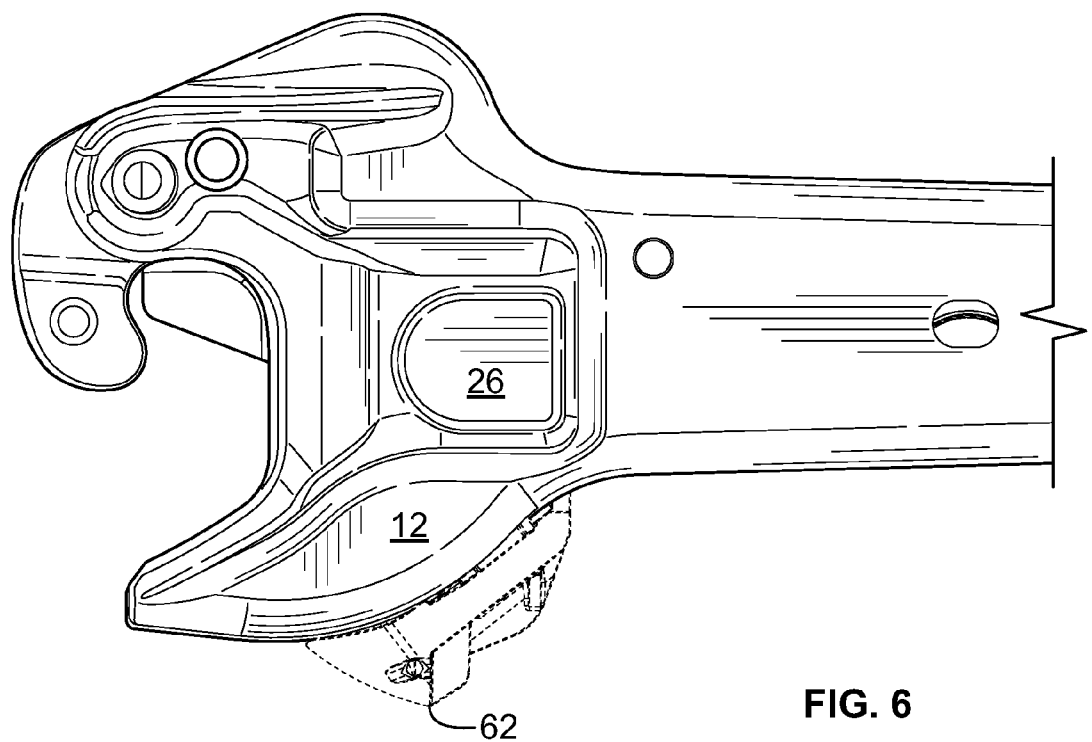
FIG. 6 is a top plan view of the profile of the bracket combination according to the invention compared to the prior art, which is depicted in dashed lines.

Bracket 16 further comprises vertical arm 46, comprising the mounting portion, and horizontal arm 48, comprising an end 18 adapted to support trainline support casting 20. Vertical arm 46 and horizontal arm 48 are laterally offset from one another by angled portion 49. FIG. 5 depicts the profile of this embodiment of the invention compared with the prior art design, shown in dashed lines in FIG. 5. Evident from FIG. 5, the bracket according to this embodiment of the invention has a narrower profile and is shorter vertically than the prior art design. Likewise, FIG. 6 shows in dashed lines where a coupler-mounted bracket according to a current commercial embodiment would be located.

It will be evident to those skilled in the art that the invention is not limited to the details of the foregoing illustrative embodiments and that the present invention may be embodied in other specific forms without departing from the spirit or essential attributes thereof.

The embodiments presented herein are, therefore, to be considered in all respects as illustrative and not restrictive of the scope of the invention, and the skilled artisan will appreciate the appropriate equivalents thereto, which are to be considered as part of this invention.

The invention claimed is:

1. A railcar coupler adapted to mount a brake line support bracket, comprising:
   a coupler head having a guard arm side, a knuckle side, and a lock hole delimited on at least the guard arm side by a lock hole wall, and
   a lug plate comprising a receiving surface and at least two apertures, each aperture configured to receive a fastener through each aperture and through a respective aperture in the brake line support bracket;
   wherein the lug plate is integral with an outboard surface of the lock hole wall and is inboard of a peripheral lateral surface of the guard arm side of the coupler head.

2. The railcar coupler according to claim 1, wherein the lug plate further comprises at least one raised horizontal locking rib on the lug plate receiving surface configured to mate with at least one locating surface on the brake line support bracket.

3. The railcar coupler according to claim 2, wherein the lug plate receiving surface comprises first and second horizontal slots adjacent the horizontal locking rib, respectively above and below the horizontal locking rib, configured to mate with the at least one locating surface on the brake line support bracket at different vertical positions of the brake line support bracket with respect to the coupler.

4. The railcar coupler according to claim 1, wherein the lug plate receiving surface further comprises a clamping face and a pair of vertical guide surfaces located on opposite peripheral edges of the clamping face, configured to engage locating surfaces on a brake line support bracket received on the clamping face.

5. The railcar coupler according to claim 1, wherein the lug plate further comprises a back surface opposing the front surface, the back surface comprising a locking recess adjacent each respective aperture, each locking recess configured to receive a fastener bolt and prevent rotation of the fastener bolt in the respective recess.

6. The railcar according to claim 1, wherein a first aperture of the at least two apertures is offset vertically and horizontally from a second aperture of the at least two apertures.

7. An assembly for mounting a brake hose fitting to a coupler head of a railcar coupler, the assembly comprising:
   a coupler head having a guard arm side, a knuckle side, and a lock hole delimited on at least the guard arm side by a lock hole wall;
   a lug plate integral with an outboard surface of the lock hole wall comprising a receiving surface facing the guard arm side of the coupler head and at least two apertures, each aperture configured to receive a respective fastener for fastening the brake line support bracket to the coupler head; and
   a brake line support bracket having a first arm extending in a vertical direction; a second arm, integral with the first arm, extending in a horizontal direction parallel to a longitudinal axis of the railcar coupler, away from the coupler head and offset laterally from the first arm; an end portion of the second arm opposite the first arm configured to receive the brake hose fitting; and a mounting portion of the first arm opposite the second arm comprising at least two mounting holes, each of said at least two mounting holes configured to align with a respective aperture on the lug plate and configured to receive a respective fastener for fastening the bracket to the lug plate of the coupler head; wherein the support bracket is inboard of all lateral peripheral surfaces of the coupler head.

8. The assembly according to claim 7, wherein the lug plate comprises at least one horizontal locking rib on the lug plate front surface, the horizontal locking rib configured to mate with at least one locating surface on the brake line support bracket.

9. The assembly according to claim 8, wherein
   the lug plate further comprises a clamping surface vertically below the locking rib, forming a groove between the locking rib and the clamping surface; and
   the brake line support bracket further comprises a horizontal locating rib adapted to be positioned in the groove between the locking rib and the clamping surface.

10. The assembly according to claim 9, wherein
    the brake line support bracket comprises at least two pairs of mounting holes, each pair of said at least two pairs of mounting holes being vertically spaced from the other of the respective pair of mounting holes, adapted to position the brake line support bracket in at two vertical positions:
    (a) a low position wherein the horizontal locating rib is positioned in the groove between the locking rib and the clamping surface, and (b) a high position wherein the horizontal locating rib is positioned vertically above the locking rib.

11. The assembly according to claim 10, wherein each of said at least two pairs of apertures comprises a first aperture offset vertically and horizontally from a second aperture.

12. The assembly according to claim 7, wherein the first arm of the brake line support bracket comprises a vertical mounting portion and an angled portion between the vertical mounting portion and the second arm of the brake line support bracket, creating a lateral offset between the longitudinal axis of the second arm and the vertical axis of the vertical mounting portion.

13. The assembly according to claim 7, wherein the lug plate receiving surface further comprises a clamping face and a pair of vertical guide surfaces located on opposite peripheral edges of the clamping face, configured to mate with vertical ribs on opposed peripheral edges of the brake line support bracket received on the clamping face, and wherein a fastener received in a mounting hole in the brake line support bracket is not subject to shear force.

14. The assembly according to claim 7, wherein the brake line support bracket comprises a recessed mating surface containing said mounting holes, said mating surface defined by a continuous rib on a horizontal top edge and opposed vertical sides edges of the brake line support bracket, wherein a side of said rib facing the mating surface engages a raised clamping surface on said lug plate.

15. The assembly according to claim 7, wherein the lug plate is a cast part of, or welded onto, the coupler head, and further comprising a pair of threaded bolts attaching the brake line support bracket to the lug plate.

16. A brake line support bracket adapted to be attached to an integral lug plate on a coupler head, the brake line support bracket comprising:
   a first arm extending in a vertical direction;
   a second arm, integral with the first arm, extending in a horizontal direction and offset laterally from the first arm by an integral angled portion on the first arm;
   an end portion of the second arm opposite the first arm configured to receive a brake hose fitting; and
   a mounting portion of the first arm opposite the second arm comprising at least two mounting holes, each of said at least two mounting holes configured to align with a respective aperture on the lug plate and configured to receive a respective fastener for fastening the bracket to the lug plate of the coupler head; wherein
   the brake line support bracket is mounted entirely inboard of a peripheral edge of the guard arm side of the coupler head.

17. The brake line support bracket according to claim 16, wherein said mounting holes are contained within a mating surface defined by a continuous rib on a horizontal top edge and opposed vertical side edges of the brake line support bracket, and wherein said continuous rib is adapted to mate with surfaces on the lug plate.

18. The brake line support bracket according to claim 17, wherein said mating surface comprises at least two pairs of mounting holes, each pair of said at least two pairs of mounting holes being vertically spaced from the other of the respective pair of mounting holes.

19. The brake line support bracket according to claim 18, wherein each of said pairs of mounting holes comprises a first mounting hole offset vertically and horizontally from a second mounting hole.

20. A railcar coupler adapted for direct mounting a brake hose fitting to a coupler head, comprising:
   a coupler head having a guard arm side, a knuckle side, and a lock hole delimited on at least the guard arm side by a lock hole wall;
   a cast feature of the coupler integral with an outboard surface of the lock hole wall and having a first arm extending in a vertical direction; a second arm, integral with the first arm, extending in a horizontal direction parallel to a longitudinal axis of the railcar coupler, away from the coupler head and offset laterally from the first arm; an end portion of the second arm opposite the first arm configured to receive the brake hose fitting wherein,
   the cast feature is inboard of all lateral peripheral surfaces of the coupler head.

* * * * *